(12) United States Patent
Kohinata et al.

(10) Patent No.: US 6,478,908 B1
(45) Date of Patent: Nov. 12, 2002

(54) PRODUCTION METHOD OF AND PRODUCTION APPARATUS FOR OPTICAL RECORDING DISC

(75) Inventors: Kokichi Kohinata, Kanagawa (JP); Shoji Akiyama, Saitama (JP); Yoshinori Itaba, Saitama (JP); Tokuhiro Morioka, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/704,812

(22) Filed: Nov. 2, 2000

(30) Foreign Application Priority Data

Nov. 2, 1999 (JP) .............................. 11-312719

(51) Int. Cl.$^7$ ................................. G11B 7/26
(52) U.S. Cl. ................... 156/74; 156/272.2; 156/275.5; 156/275.7; 156/295; 427/240
(58) Field of Search ............................. 156/74, 272.2, 156/275.5, 275.7, 295; 118/52; 427/240

(56) References Cited

FOREIGN PATENT DOCUMENTS

| WO | WO 9735720 | * 10/1997 |
| WO | WO 9907542 | * 2/1999 |

* cited by examiner

Primary Examiner—Michael W. Ball
Assistant Examiner—John T. Haran
(74) Attorney, Agent, or Firm—Sonnenschein, Nath & Rosenthal (57) ABSTRACT

This invention relates to how to obtain an optical recording disc with a good quality, capable of achieving a beautiful outline shape of the inner peripheral part side rim part of the cured ultraviolet ray curing type resin substantially concentrically even in the case there is irregularity of the wettability of both round substrates with respect to the ultraviolet ray curing type resin, and capable of providing an even film thickness of the resin with the film thickness controlled to a predetermined value or less even in the case there are irregularity of the wettability of both round substrates, difficulty in controlling the centrifugal force applied on the resin, irregularity of the plate thickness of both round substrates, or the like.

Either one of both substrates is rotated at a low speed with the other one fixed while pressuring between both substrates of an optical recording disc comprising both substrates temporarily bonded via a ring-like ultraviolet ray curing type resin disposed substantially concentrically with the substrates for forming a layer with a predetermined even thickness by the spread, the optical recording disc temporarily bonded having the layer-like resin is rotated at a high speed, and an ultraviolet ray is irradiated to the optical recording disc temporarily bonded and rotated at the high speed for curing the layer-like resin.

12 Claims, 5 Drawing Sheets

Pressure Application and Rotation at a Constant Speed

FIG.2B

High Speed Rotation

FIG.2C

Ultraviolet Ray

PRODUCTION METHOD OF AND PRODUCTION APPARATUS FOR OPTICAL RECORDING DISC

RELATED APPLICATION DATA

The present application claims priority to Japanese Application No. P11-312719 filed Nov. 2, 1999, which application is incorporated herein by reference to the extent permitted by law.

BACKGROUND OF THE INVENTION

1. Field of the Invention

The present invention relates to a production method of and an production apparatus for an optical recording disc comprising two round substrates bonded with each other.

2. Description of the Related Art

Figure 1A:
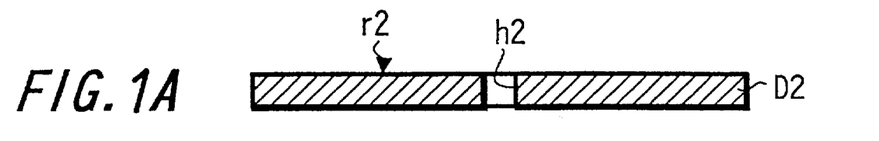
FIGS. 1A to 1E are step diagrams showing a production method of an optical recording disc according to a conceptional example.

With reference to FIGS. 1A to 1E, a conventional production method of an optical recording disc will be explained. As shown in FIG. 1A, a second round substrate having 120 mm in diameter (made from, for example, polycarbonate) D2 is prepared. h2 is the center hole of the second round substrate D2. r2 is the recording surface of the second round substrate D2, with a data recording trace (comprising pit rows with different lengths and widths) formed concentrically or along a track tantamount to a circle.

Figure 1B:
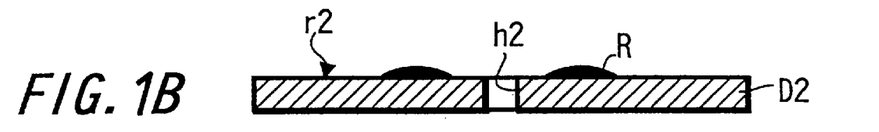

As shown in FIG. 1B, an ultraviolet ray curing type resin R as an adhesive is dropped onto the recording surface r2 while rotating the second round recording plate D2 at an adequate position in the range of 15 mm to 50 mm in radius on the recording surface r2 of the second round recording plate D2 so as to apply the ultraviolet ray curing type resin R like a ring with a predetermined width substantially concentric with the second round substrate D2.

Figure 1C:
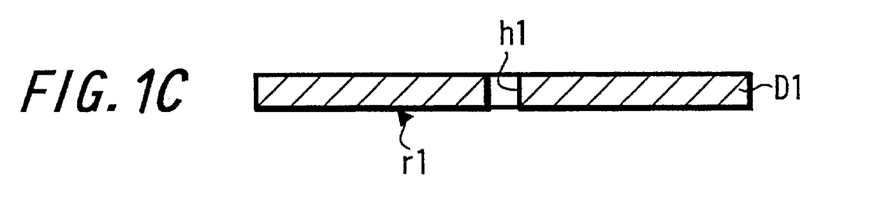

As shown in FIG. 1C, a first round substrate having a 120 mm diameter (made from, for example, polycarbonate) D1 is prepared. h1 is the center hole of the first round substrate D1. r1 is the recording surface of the first round substrate D1, with a data recording trace (comprising pit rows with different lengths and widths) formed concentrically or along a track tantamount to a circle.

Figure 1D:
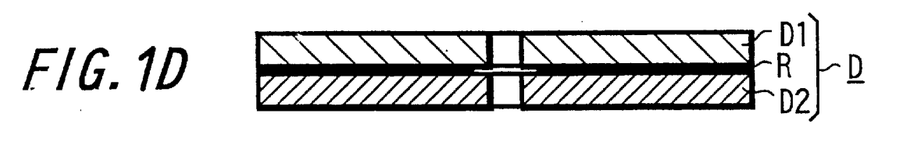

As shown in FIG. 1D, the recording surfaces r1, r2 of the first and second substrates D1, D2 are superimposed via the ultraviolet ray curing type resin R for uncured bonding so as to obtain an optical recording disc. The optical recording disc obtained by the uncured bonding is rotated at a high speed so as to spread the ultraviolet ray curing type resin R between the first and second round substrates D1, D2 to the whole portion of the inner peripheral part and the outer peripheral part by the centrifugal force so as to have an even thickness to thereby obtain an optical recording disc D by the uncured bonding.

Figure 1E:
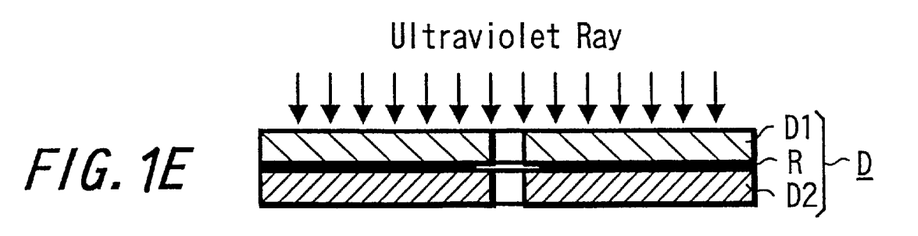

As shown in FIG. 1E, by irradiating an ultraviolet ray to the optical recording disc D comprising the first and second round substrates D1, D2 obtained by the uncured bonding via the ultraviolet ray curing type resin R spread in FIG. 6D for curing the ultraviolet ray curing type resin R, the first and second round substrates D1, D2 are bonded so as to provide a completed optical recording disc D.

According to the conventional production method of an optical recording disc, due to the irregularity of the wettability of the first and second round substrates with respect to the ultraviolet ray curing type resin, irregularity is generated in the spread of the ultraviolet ray curing type resin so that the ultraviolet ray curing type resin cannot be spread substantially concentric to the inner peripheral side like the first and second round substrates. Therefore, the inner peripheral side rim part of the cured ultraviolet ray curing type resin between the first and second round substrates cannot provide a beautiful outline shape substantially concentrically with the first and second round substrates, and thus an optical recording disc with a good quality has not been obtained.

Moreover, according to the conventional production method of an optical recording disc, the first and second round substrates are bonded via the ultraviolet ray curing type resin by the uncured bonding, and the disc obtained by the uncured bonding is rotated at a high speed so as to have the film thickness of the uncured ultraviolet ray curing type resin at a predetermined value. However, due to the irregularity of the wettability of the first and second round substrates with respect to the ultraviolet ray curing type resin, difficulty in controlling the centrifugal force applied on the uncured ultraviolet ray curing type resin, the irregularity of the plate thickness of the first and second round substrates, or the like, it has been difficult to obtain an optical recording disc with an even cured ultraviolet ray curing type resin film thickness between the first and second round substrate and a good quality.

Furthermore, among digital video discs (DVD) as one of the conventional optical recording discs, there are DVDs having a standard of a 20 $\mu$m or less film thickness of the cured ultraviolet ray curing type resin between the first and second round substrates. According to the conventional production method for an optical recording disc, it has been extremely difficult to obtain a DVD with a 20 $\mu$m or less film thickness of the cured ultraviolet ray curing type resin.

SUMMARY OF THE INVENTION

The prevent invention is to propose a production method and a production apparatus for an optical recording disc, capable of achieving a beautiful outline shape of the inner peripheral part side rim part of the cured ultraviolet ray curing type resin substantially concentrically with the first and second round substrates by spreading substantially concentric the ultraviolet ray curing type resin to the inner peripheral side like the first and second round substrates even in the case there is irregularity of the wettability of the first and second round substrates with respect to the ultraviolet ray curing type resin, and capable of obtaining an optical recording disc with a good quality by providing a even film thickness of the cured ultraviolet ray curing type resin with the film thickness controlled to a predetermined value or less even in the case there are irregularity of the wettability of both round substrates with respect to the ultraviolet ray curing type resin, difficulty in controlling the centrifugal force applied on the uncured ultraviolet ray curing type resin, irregularity of the plate thickness of the first and second round substrates, or the like.

A production of an optical recording disc according to a first aspect of the present invention comprises the steps of forming a layer of the ultraviolet ray curing type resin having a predetermined even thickness spread by rotating either one of the first and second round substrates at a low speed with the other one fixed while applying pressure on the first and second round substrates of an optical recording disc provided by uncured bonding of ring-like ultraviolet ray curing type resin disposed between first and second round substrates substantially concentrically with the first and second round substrates, rotating the optical recording disc provided by the uncured bonding, having the layer-like ultraviolet ray curing type resin with the predetermined even thickness, and irradiating an ultraviolet ray to the optical recording disc provided by the uncured bonding rotated at the high speed for curing the layer-like ultraviolet ray curing type resin so as to obtain a completed optical recording disc with the first and second round substrates attached.

According to the first aspect of the invention, a completed optical recording disc with the first and second round substrates attached is obtained by forming a layer of the ultraviolet ray curing type resin having a predetermined even thickness with the spread thereof by rotating either one of the first and second round substrates at a low speed with the other one fixed while applying pressure on the first and second round substrates of an optical recording disc provided by uncured bonding of a ring-like ultraviolet ray curing type resin disposed between first and second round substrates substantially concentrically with the first and second round substrates, rotating the optical recording disc provided by the uncured bonding, having the layer-like ultraviolet ray curing type resin with the predetermined even thickness, and irradiating an ultraviolet ray to the optical recording disc provided by the uncured bonding rotated at the high speed for curing the layer-like ultraviolet ray curing type resin.

DESCRIPTION OF THE PREFERRED EMBODIMENTS

A first aspect of the present invention is a production method of an optical recording disc comprising the steps of forming a layer of the ultraviolet ray curing type resin having a predetermined even thickness with the spread thereof by rotating either one of the first and second round substrates at a low speed with the other one fixed while applying pressure on the first and second round substrates of an optical recording disc provided by uncured bonding of a ring-like ultraviolet ray curing type resin disposed between first and second round substrates substantially concentrically with the first and second round substrates, rotating the optical recording disc provided by the uncured bonding, having the layer-like ultraviolet ray curing type resin with the predetermined even thickness, and irradiating an ultraviolet ray to the optical recording disc provided by the uncured bonding rotated at the high speed for curing the layer-like ultraviolet ray curing type resin so as to obtain a completed optical recording disc with the first and second round substrates attached.

A second aspect of the present invention is a production method of an optical recording disc comprising the steps of forming a layer of the ultraviolet ray curing type resin having a predetermined even thickness with the spread thereof by rotating at a low speed while applying pressure on the first and second round substrates of an optical recording disc provided by uncured bonding of a ring-like ultraviolet ray curing type resin disposed between first and second round substrates substantially concentrically with the first and second round substrates, rotating the optical recording disc provided by the uncured bonding, having the layer-like ultraviolet ray curing type resin with the predetermined even thickness, and irradiating an ultraviolet ray to the optical recording disc provided by the uncured bonding rotated at the high speed for curing the layer-like ultraviolet ray curing type resin so as to obtain a completed optical recording disc with the first and second round substrates attached.

A third aspect of the present invention is the production method of an optical recording disc according to the first aspect, wherein the pressure applied between the first and second round substrates is measured so that the pressuring operation between the first and second round substrates and the low speed rotation of the optical recording disc obtained by the uncured bonding are finished when the measured pressure becomes a predetermined value according to a predetermined thickness of the ultraviolet ray curing type resin layer.

A fourth aspect of the present invention is the production method of an optical recording disc according to the first aspect, wherein the movement amount of the first or second round substrate from a reference position during the pressuring operation between the first and second round substrates is measured so that the pressuring operation between the first and second round substrates and the low speed rotation of the optical recording disc obtained by the uncured bonding are finished when the measured movement amount becomes a predetermined value according to a predetermined thickness of the ultraviolet ray curing type resin layer.

A fifth aspect of the present invention is the production method of an optical recording disc according to the second aspect, wherein the pressure applied between the first and second round substrates is measured so that the pressuring operation between the first and second round substrates and the low speed rotation of the optical recording disc obtained by the uncured bonding are finished when the measured pressure becomes a predetermined value according to a predetermined thickness of the ultraviolet ray curing type resin layer.

A sixth aspect of the present invention is the production method of an optical recording disc according to the second aspect, wherein the movement amount of the first or second round substrate from a reference position during the pressuring operation between the first and second round substrates is measured so that the pressuring operation between the first and second round substrates and the low speed rotation of the optical recording disc obtained by the uncured bonding are finished when the measured movement amount becomes a predetermined value according to a predetermined thickness of the ultraviolet ray curing type resin layer.

A seventh aspect of the present invention is a production apparatus for an optical recording disc, comprising a disc holding means for holding the first round substrate of an optical recording disc obtained by uncured bonding of a ring-like ultraviolet ray curing type resin disposed between first and second round substrates substantially concentrically with the first and second round substrates, a disc low speed rotation driving means for holding the second round substrate of the optical recording disc obtained by the uncured bonding for low speed rotation drive, a disc forcing and driving means for forcing the disc low speed rotation driving means against the first round substrate held by the disc holding means, a high speed rotation driving means for high speed rotation drive of the optical recording disc obtained by the uncured bonding, and an ultraviolet ray irradiating means for irradiating an ultraviolet ray to the optical recording disc obtained by the uncured bonding.

An eighth aspect of the present invention is the production apparatus for an optical recording disc according to the seventh aspect, wherein a pressure measuring means for measuring the pressure applied on the first and second round substrates is provided in the disc holding means so that the operation of pressing the disc low speed rotation driving means against the first round substrate by the disc pressing and driving means and the low speed rotation of the second round substrate by the disc low speed rotation driving means are finished when the pressure measured by the pressure measuring means becomes a predetermined value according to a predetermined thickness of the ultraviolet ray curing type resin layer.

Hereinafter, with reference to FIGS. 2 to 6, concrete examples of the mode for carrying out the invention of a production method of and a production apparatus for an optical recording disc will be explained in detail.

Figure 2A:
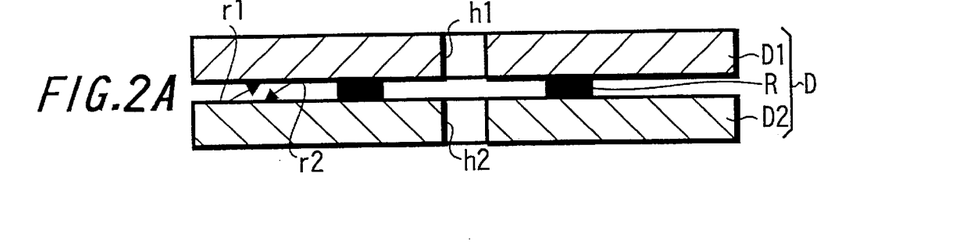
FIGS. 2A to 2D are step diagrams showing a production method of an optical recording disc according to a concrete example of an embodiment of the present invention.

First, with reference to FIGS. 2A to 2D, a concrete example of a production method for an optical recording disc will be explained. In FIG. 2A, D1 and D2 represent first and second round substrates (made from, for example, polycarbonate) each having 120 mm in diameter, and each provided with a center hole hi and h2. The first and second round substrates D1, D2 are disposed with each recording surface r1, r2 facing each other, and a ring-like ultraviolet ray curing type resin R concentric with the first and second round substrates D1, D2 is provided therebetween at an appropriate position in 15 mm to 50 mm in radius of the first and second round substrates. A data recording trace (comprising pit rows with different lengths and widths) is formed in the recording surfaces r1, r2 concentrically or along a track tantamount to a circle.

As shown in FIG. 2A, the first round substrate D1 is superimposed on the second round substrate via the ultraviolet ray curing type resin R by first applying the ultraviolet ray curing type resin R on the recording surface r2 of the second round substrate D2, and placing the first round substrate D1 thereon, or by applying the ultraviolet ray curing type resin R by first applying the ultraviolet ray curing type resin R on the recording surface r1 of the first round substrate D1, thereafter reversing the first round substrate D1 applied with the ultraviolet ray curing type resin R, and placing the same on the second round substrate D2. In the latter case, since the area of the ultraviolet ray curing type resin R on the first round substrate D1 initially contacting with the surface of the second round substrate D2 is small, the number of bubbles taken in the ultraviolet ray curing type resin R can be smaller than that of the former case, and thus a high quality optical recording disc can be obtained.

Figure 2B:
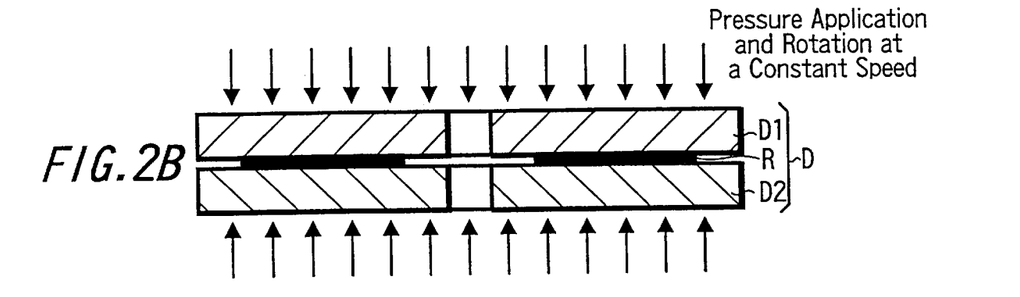

As shown in FIG. 2B, while applying a pressure between the first and second round substrates D1, D2, one of the first and second round substrates D1, D2 is rotated at a low speed with the other one fixed, or the first and second round substrates D1, D2 are rotated integrally at a low speed simultaneously. When the thickness of the ultraviolet ray curing type resin R is thinned to a predetermined value, the pressuring operation between the first and second round substrates D1, D2 and the low speed rotation of the first or second round substrate D1, D2, or the low speed rotation of the first and second round substrates D1, D2 are stopped.

By applying pressure on the first and second round substrates D1, D2, regardless of the irregularity of the wettability of the first and second substrates D1, D2 with respect to the ultraviolet ray curing type resin R, the thickness of the ultraviolet ray curing type resin R can be constant. Moreover, by applying pressure on the first and second substrates D1, D2, as well as rotating either one or both of the first and second substrates D1, D2, even in the case there is a thickness irregularity in either one or both of the first and second substrates D1, D2, the ring-like ultraviolet ray curing type resin R substantially concentric with the first and second round substrates D1,D2 between the first and second round substrates D1, D2 is spread toward the inner peripheral code and the outer peripheral side substantially concentrically so that the thickness of the whole portion of the first and second round substrates D1, D2 and the ultraviolet ray curing resin R can be predetermined even thickness. Accordingly, a large margin can be obtained with respect to a thickness standard value of the ultraviolet ray curing type resin R.

Whether or not the thickness of the ultraviolet ray curing type resin R is thinned to a predetermined value is detected by whether or not the movement amount of the other becomes a predetermined value with the position of one of the first and second round substrates D1, D2 fixed in the thickness direction, or by whether or not the sum of the movement amount of both first and second round substrates D1, D2 becomes a predetermined value. Moreover, whether or not the thickness of the ultraviolet ray curing type resin R is thinned to a predetermined value can also be detected by whether or not the amount of pressure on the other becomes a predetermined value with the position of one of the first and second round substrates D1, D2 fixed in the thickness direction, or by whether or not the sum of the amount of pressure on both first and second round substrates D1, D2 becomes a predetermined value.

Figure 2C:
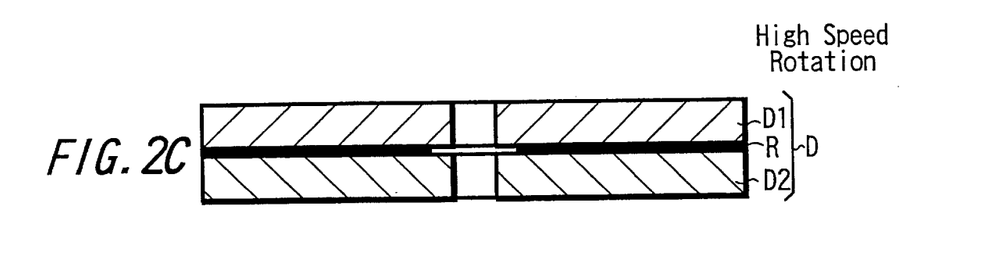

As shown in FIG. 2C, the first and second round substrates D1, D2 are rotated integrally and simultaneously at a high speed for a predetermined time. Thereby, the ultraviolet ray curing type resin R between the first and second substrates D1, D2 can further be thinned.

Figure 2D:
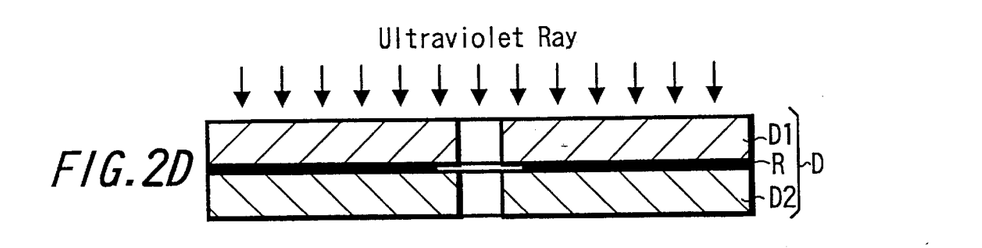

As shown in FIG. 2D, an ultraviolet ray is irradiated to the ultraviolet ray curing type resin R via one of the first and second round substrates D1, D2, here, the first substrate D1 for curing the ultraviolet ray curing type resin R. Thereby a completed recording disc D with the first and second round substrates D1, D2 bonded together can be obtained.

Next, with reference to FIGS. 3 to 6, a production apparatus for an optical recording disc according to a concrete example will be explained. First, the production apparatus for an optical recording disc (plan view) shown in FIG. 6 according to the concrete example will be explained. BS denotes a base stand. Rotation tables RT1, RT2 a rotation arm holder RH2 and a rotation table RT3 are mounted on the base stand BS, arranged successively from the right side to the left side. The rotation tables RT1, RT2 respectively provided with six holes H1, H2 at a 60 degree interval, rotate intermittently by 60 degrees. The diameter of each of the six holes H1, H2 is formed shorter than the diameter of the above-mentioned first and second round substrates D1, D2. The rotation table RT3 rotates intermittently by 90 degrees with four optical recording discs D placed at every 90 degrees so as to be rotated. A sector-shaped cover CV of substantially 140 degrees is mounted on the base stand BS as well as an ultraviolet ray (UV) lamp LUV is mounted on the cover CV such that an ultraviolet ray from the ultraviolet ray lamp LUV can be irradiated onto the optical recording discs D through a window (not illustrated) provided on the cover CV, passing below the cover CV while rotating.

Figure 6:
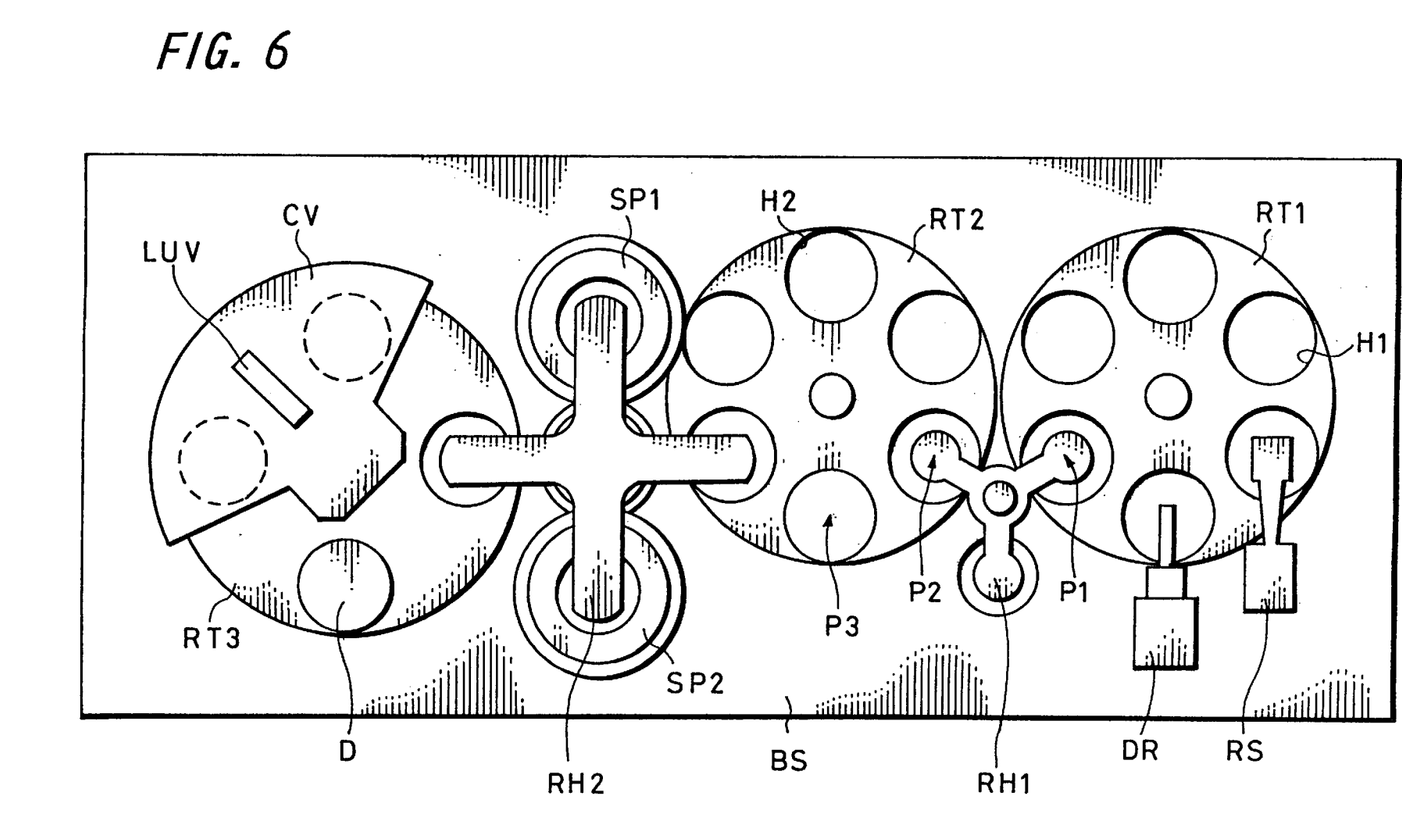
FIG. 6 is a plan view showing a production apparatus for an optical recording disc according to a concrete example.

In FIG. 6, RS denotes a resin supply part, mounted on the base stand BS. The resin supply part RS has a nozzle (not illustrated) for dropping the ultraviolet ray curing type resin R onto the first round substrate D1 (not illustrated in FIG. 6) on the rotation table RT1. An unillustrated disc rotating means for slowly rotating the first round substrate is mounted on the base stand BS below the nozzle of the resin supply part RS as well as below the rotation table RT1. The disc rotating means drops the ultraviolet ray curing type resin R from the nozzle of the resin supply part RS onto the recording surface r1 of the first round substrate D1 like a ring through the hole H1 on the rotation table RT1 while rotating the first round substrate D1 (not illustrated in FIG. 6) on the hole H1. Thereafter, the rotation table RT1 is turned clockwise by 60 degrees.

DR denotes a disc reversing device for reversing the first round substrate D1 applied with the ultraviolet ray curing type resin R rotated and conveyed by the rotation table RT1, that is, for turning by 180 degrees.

Figure 4:
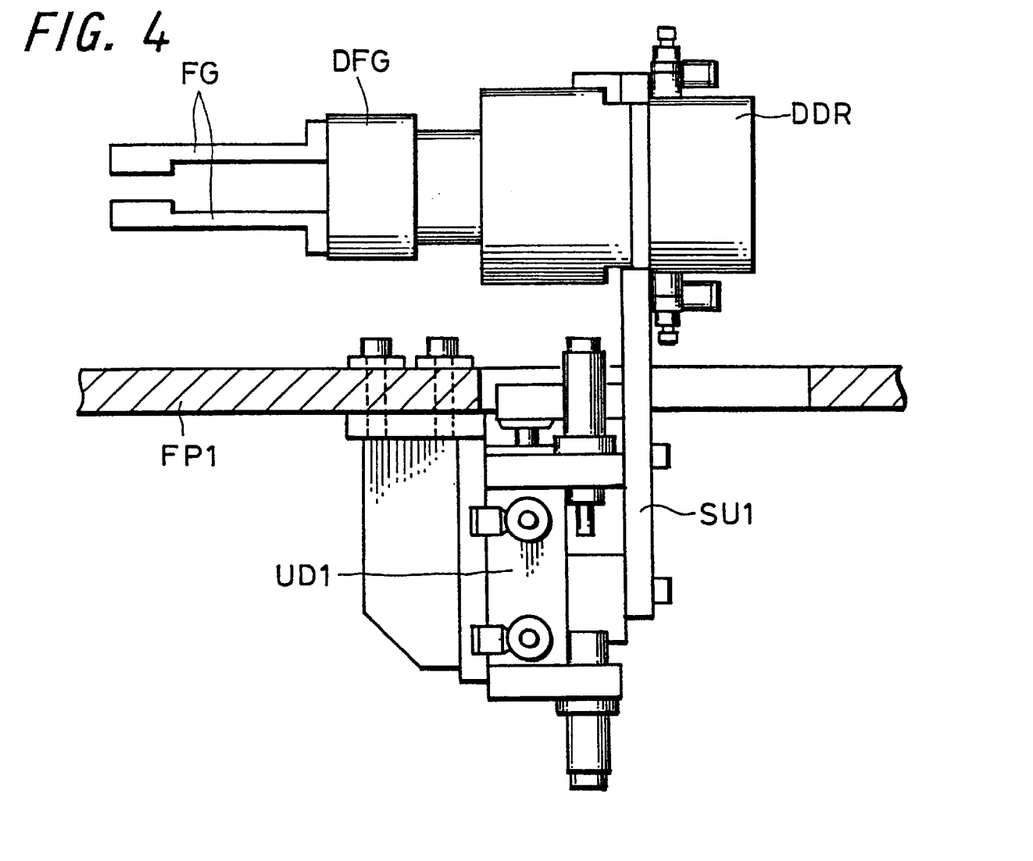
FIG. 4 is a side view of a disc reversing device of a production apparatus for an optical recording disc according to a concrete example.

Next, with reference to FIG. 4, the structure (side view) of an example of the disc reversing device will be explained. FP1 is a fixing plate. A disc vertically driving source UD1 comprising, for example, an air cylinder, is mounted on the fixing plate FP1. The disc vertically driving source UD1 is provided with a vertically movable slide unit SU1. A disc reversing driving source DDR comprising, for example, a rotary actuator, is mounted above the slide unit SU1. A finger driving source DFG comprising, for example, an air check, is mounted on the disc rotating driving source DDR. Two fingers FG parallel with each other are mounted on the finger driving source DFG. The two fingers FG are parallelly moved by the finger driving source DFG so as to vary the distance between the two fingers FG.

In the disc reversing device DR, in the case the disc reversing driving source DDR is at a position lower than the fixing plate FP1, the first round substrate D1 on the hole H1 of the rotation table RT1 is held at its center hole h1 with the opening/closure of the two fingers FG. Thereafter, the disc reversing driving source DDR lifts up the disc vertically driving source UD1 via the slide unit SU1 to a degree not causing a trouble thereby to the rotation of the first round substrate D1 by the finger driving source DFG. Thereafter, the two fingers FG holding the first round substrate D1 are turned by 180 degrees by the finger driving source DFG. Thereafter, the disc reversing driving source DDR is lowered by the disc vertically driving source UD1 via the slide unit SU1 so as to approach the fixing plate FP1 so that the reversed first round substrate D1 applied with the ultraviolet ray curing type resin R is returned onto the hole H1 of the rotation table RT1. Thereafter, the rotation table RT1 is turned clockwise by 60 degrees.

Again, with reference to FIG. 6, explanation will be given. RH1 is a rotation arm holder for holding and conveying the first round substrate D1 from the rotation table RT1 To the rotation table RT2, and has, for example, three arms. Disc vertically driving devices with the structure shown in FIG. 5 respectively mounted at positions P1, p2 on the base stand BS below the rotation table RT1.

Figure 5:
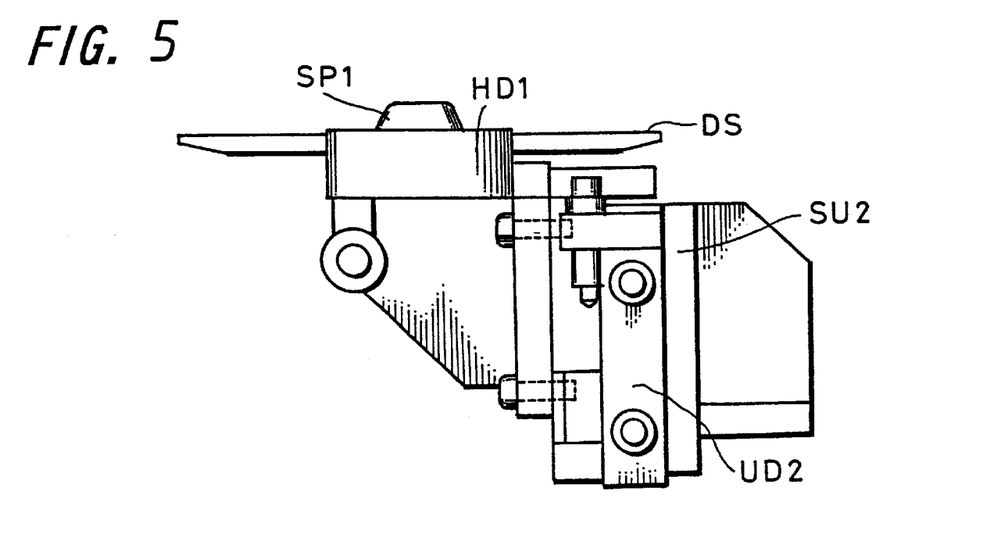
FIG. 5 is a side view showing a disc vertically driving device of a production apparatus for an optical recording disc according to a concrete example.

Hereinafter, the structure (side view) of an example of the disc vertically driving device of FIG. 5 will be explained. UD2 denotes a disc vertically driving source comprising, for example, an air cylinder, mounted on the base stand BS. The disc vertically driving source UD2 is provided with a slide unit SU2. A holder HD1 and a spindle SP1 are mounted on the slide unit SU2. DS is a saucer mounted on the holder HD1, for receiving the ultraviolet ray curing type resin R applied on the first round substrate D1 in the case it is dropped. The saucer DS is necessary for the disc vertically driving device at the point P1 on the base stand BS, but since it is not necessary for the disc vertically driving device at the point P2, the saucer DS is not provided.

The disc vertically driving device provided at the point P1 on the base stand BS lifts up the first round substrate D1 applied with the ultraviolet ray curing type resin on the lower surface on the hole H1 of the rotation table RT1 so that it is held by the rotation arm holder RH1. Thereafter, the rotation arm holder RH1 is turned counterclockwise by 120 degrees.

Figure 3A:
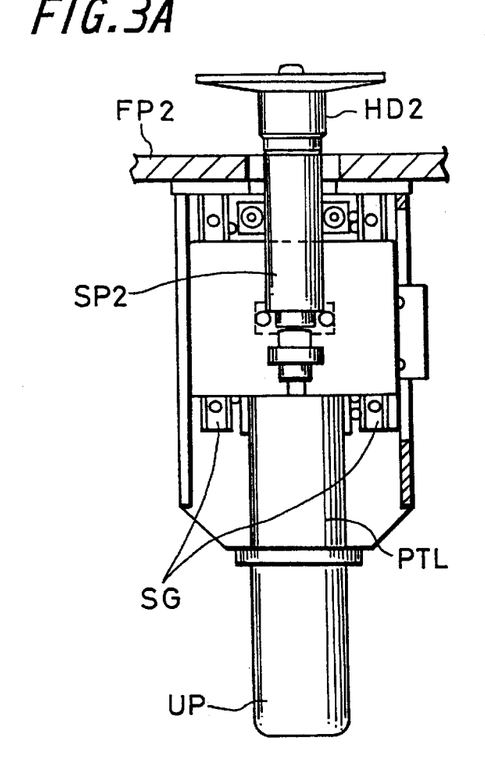
FIG. 3A is a front view of a disc rotating device.
Figure 3B:
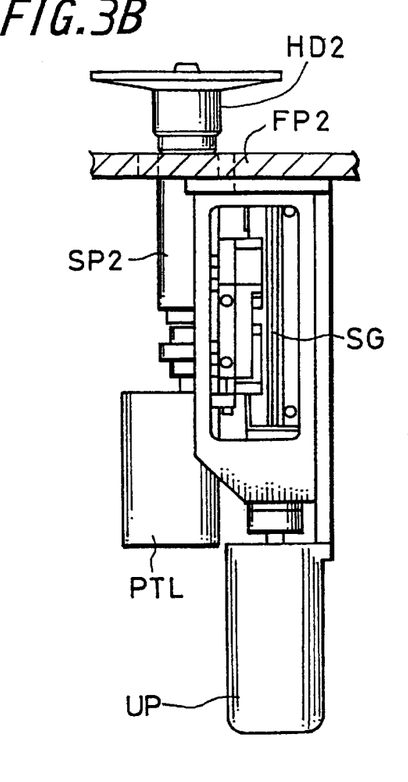
FIG. 3B is a side view of the disc rotating device.
Figure 3C:
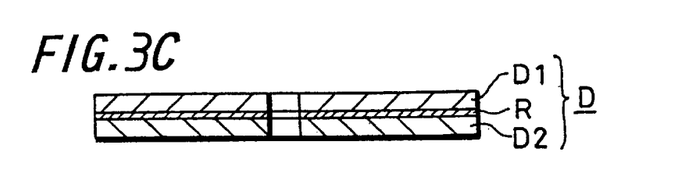
FIG. 3C is a cross-sectional view showing an optical recording disc.
Figure 3D:
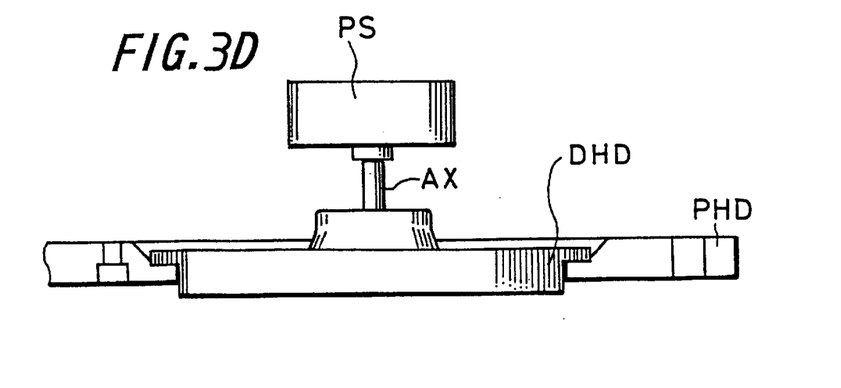
FIG. 3D is a front view showing a disc holder.

A disc pressuring and rotating device (front view and side view) shown in FIG. 3A, 3B is provided on the point P3 on the base stand BS below the rotation table RT2 as well as a disc holder for holding the first round substrate D1 shown in FIG. 3D is provided at the point P3 on the base stand above the rotation table RT2.

Hereinafter, the disc pressuring and rotating device shown in FIGS. 3A, 3B will be explained. First, with reference to FIGS. 3A, 3B showing a front view and a side view, the disc pressuring and rotating device will be explained. HD2 denotes a holder for holding the second round substrate D2. The holder HD2 is mounted on the free end of a spindle SP2 so that the holder HD2 is rotated and driven at a low speed via the spindle SP2 by a disc low speed rotation driving source PTL comprising, for example, a motor. The low speed rotation driving source PTL provided movably along two slide guides SG disposed parallel with each other has a function of, for example, vertically moving the holder HD2, in particular, a function of pushing up the second round substrate D2 of the optical recording disc D of FIG. 3C by converting the rotation force of a disc pushing up driving source (disc vertically driving source) UP comprising, for example, a motor into a linear moving force by an unillustrated ball screw.

Hereinafter, with reference to FIG. 3D, a disc holder for holding the first round substrate D1 of the optical recording disc D of FIG. 3C will be explained. DHD denotes a disc holder, mounted on a holding plate PHD. The disc holder DHD is provided with a pressure detecting device PS comprising, for example, a load cell via a central axis.

The disc pressuring and rotating device shown in FIGS. 3A, 3B is provided also at the point P2. At the point P2, the first round substrate D1 is held by the rotation arm holder PH1, and the second round substrate D2 conveyed by the rotation table RT2 is lifted up by the disc pressuring and rotating device so as to be pressed against the ring-like ultraviolet ray curing type resin R applied on the lower surface of the first round substrate D1. Thereafter, the optical recording disc D comprising the first and second round substrates D1, D2 obtained by the uncured bonding is rotated and conveyed from the point P2 position to the point P3 position according to a clockwise 60 degree rotation of the rotation table RT2.

Then, at the point P3, the optical recording disc D obtained by the uncured bonding on the rotation table RT2 is lifted up by the holder HD2 of the disc pressuring and rotating device shown in FIGS. 3A, B, and pushed up to the disc holder DHD in a fixed position so that only the first round substrate D1 is held by the disc holder DHD. Since the applied pressure by the disc pressuring and rotation device with respect to the optical recording disc D is detected by the pressure detecting device PS, in the case the applied pressure becomes a predetermined value, the first round substrate D1 is suctioned by the disc holder DHD as well as the second round substrate D2 is suctioned by the holder HD2. While applying a predetermined pressure between the first and second round substrates D1, D2 by the disc pushing up driving source UP, the low speed rotation of the second round substrate D2 by the disc low speed rotation driving source PTL is started. In the case it is detected by the pressure detecting device PS that the applied pressure by the disc pressuring and rotating device shown in FIGS. 3A, B with respect to the optical recording disc D is raised according to the spread of the ultraviolet ray curing type resin R, and the applied pressure becomes a predetermined value according to a predetermined thickness of the ultraviolet ray curing type resin R, the low speed rotation by the disc low speed rotation driving source PTL and the pressuring operation by the disc pushing up driving source UP with respect to the optical recording disc D are finished as well as the suction of the first round substrate D1 by the disc holder DHD and the suction of the second round substrate D2 by the holder HD2 are released. According to the lowering operation of the optical recording disc D obtained by the uncured bonding by the disc pushing up driving source UP, the optical recording disc D is placed on the rotation table RT2.

The optical recording disc D obtained by the uncured bonding after the low speed rotation and the pressuring operation is rotated and conveyed by 60 degrees clockwise by the rotation table RT2. Thereafter, it is conveyed to and mounted on a spin chamber (swing chamber) SP1 or SP2 by the lowering operation of the rotation arm holder RH2, the suction of the disc D, the elevating operation, the 90 degree clockwise rotation and conveyance, the lowering operation and the release of the suction of the disc D. Then, it is rotated there at a high speed for a predetermined time.

The rotation speed of the optical recording disc D obtained by the uncured bonding at the time of the low speed rotation and the high speed rotation differs, depending on the viscosity of the ultraviolet ray curing type resin R, the air temperature, or the like, but as an example, in the case the rotational frequency at the time of the high speed rotation is, for example, 2,000 rpm, the rotational frequency at the time of the low speed rotation is set at, for example, 50 to 500 rpm.

The optical recording disc D obtained by the uncured bonding rotated at a high speed by the spin chamber SP1 or SP2 is conveyed and placed onto the rotation table RT3 by the lowering operation of the rotation arm holder RH2, the suction of the disc D, the elevating operation, the 90 degree clockwise rotation and conveyance, the lowering operation and the release of the suction of the disc D.

The optical recording disc D obtained by the uncured bonding placed on the rotation table RT3 passes below the cover CV according to the rotation of the rotation table RT3. Thereby, an ultraviolet ray from the UV lamp LUV is irradiated so as to consequently cure the ultraviolet ray curing type resin R between the first and second round substrates D1, D2 so that a completed optical recording disc D with the first and second round substrates D1, D2 bonded together can be obtained. Thereafter, the rotation arm holder RH2 is rotated reversely for repeating the above-mentioned operation for a next optical recording disc D.

Although the case of an optical recording disc D with a data recording trace formed concentrically or along a track close to a circle on the recording surfaces r1, r2 of the first and second round substrates D1, D2 has been explained above, it can also be adopted to the case with an optically recordable layer formed.

According to the first aspect of the present invention, since a completed optical recording disc with the first and second round substrates bonded together is obtained by forming a layer of the ultraviolet ray curing type resin having a predetermined even thickness with the spread thereof by rotating either one of the first and second round substrates at a low speed with the other one fixed while pressuring between the first and second round substrates of an optical recording disc provided by uncured bonding of a ring-like ultraviolet ray curing type resin disposed between first and second round substrates substantially concentrically with the first and second round substrates, rotating the optical recording disc provided by the uncured bonding, having the layer-like ultraviolet ray curing type resin with the predetermined even thickness, and irradiating an ultraviolet ray to the optical recording disc provided by the uncured bonding rotated at the high speed for curing the layer-like ultraviolet ray curing type resin, a production method of an optical recording disc, capable of achieving a beautiful outline shape of the inner peripheral part side rim part of the cured ultraviolet ray curing type resin substantially concentrically with the first and second round substrates by spreading the ultraviolet ray curing type resin to the inner peripheral side substantially concentrically with the first and second round substrates even in the case there is irregularity of the wettability of the first and second round substrates with respect to the ultraviolet ray curing type resin, and capable of obtaining an optical recording disc with a good quality by providing an even film thickness of the cured ultraviolet ray curing type resin with the film thickness controlled to a predetermined value or less even in the case there are irregularity of the wettability of both round substrates with respect to the ultraviolet ray curing type resin, difficulty in controlling the centrifugal force applied on the uncured ultraviolet ray curing type resin, irregularity of the plate thickness of the first and second round substrates, or the like, can be obtained.

According to the second aspect of the present invention, since a completed optical recording disc with the first and second round substrates bonded together is obtained by forming a layer of the ultraviolet ray curing type resin having a predetermined even thickness with the spread thereof by rotating at a low speed while pressuring therebetween the first and second round substrates of an optical recording disc provided by uncured bonding of a ring-like ultraviolet ray curing type resin disposed between first and second round substrates substantially concentrically with the first and second round substrates, rotating the optical recording disc provided by the uncured bonding, having the layer-like ultraviolet ray curing type resin with the predetermined even thickness, and irradiating an ultraviolet ray to the optical recording disc provided by the uncured bonding rotated at the high speed for curing the layer-like ultraviolet ray curing type resin, a production method of an optical recording disc, capable of achieving a beautiful outline shape of the inner peripheral part side rim part of the cured ultraviolet ray curing type resin substantially concentrically with the first and second round substrates by spreading the ultraviolet ray curing type resin to the inner peripheral side substantially concentrically with the first and second round substrates even in the case there is irregularity of the wettability of the first and second round substrates with respect to the ultraviolet ray curing type resin, and capable of obtaining an optical recording disc with a good quality by providing an even film thickness of the cured ultraviolet ray curing type resin with the film thickness controlled to a predetermined value or less even in the case there are irregularity of the wettability of both round substrates with respect to the ultraviolet ray curing type resin, difficulty in controlling the centrifugal force applied on the uncured ultraviolet ray curing type resin, irregularity of the plate thickness of the first and second round substrates, or the like, can be obtained.

According to the third aspect of the present invention comprising the first aspect, since the pressure applied between the first and second round substrates is measured so that the pressuring operation between the first and second round substrates and the low speed rotation of the optical recording disc obtained by the uncured bonding are finished when the measured pressure becomes a predetermined value according to a predetermined thickness of the ultraviolet ray curing type resin layer, a production method of an optical recording disc, capable of achieving a beautiful outline shape of the inner peripheral part side rim part of the cured ultraviolet ray curing type resin substantially concentrically with the first and second round substrates by spreading the ultraviolet ray curing type resin to the inner peripheral side substantially concentrically with the first and second round substrates even in the case there is irregularity of the wettability of the first and second round substrates with respect to the ultraviolet ray curing type resin, and capable of obtaining an optical recording disc with a good quality by providing an even film thickness of the cured ultraviolet ray curing type resin with the film thickness controlled to a predetermined value or less even in the case there are irregularity of the wettability of both round substrates with respect to the ultraviolet ray curing type resin, difficulty in controlling the centrifugal force applied on the uncured ultraviolet ray curing type resin, irregularity of the plate thickness of the first and second round substrates, or the like, can be obtained.

Accordingly to the fourth aspect of the present invention comprising the first aspect, since the movement amount of the first or second round substrate from a reference position during the pressuring operation between the first and second round substrates is measured so that the pressuring operation between the first and second round substrates and the low speed rotation of the optical recording disc obtained by the uncured bonding are finished when the measured movement amount becomes a predetermined value according to a predetermined thickness of the ultraviolet ray curing type resin layer, a production method of an optical recording disc, capable of achieving a beautiful outline shape of the inner peripheral part side rim part of the cured ultraviolet ray curing type resin substantially concentrically with the first and second round substrates by spreading the ultraviolet ray curing type resin to the inner peripheral side substantially concentrically with the first and second round substrates even in the case there is irregularity of the wettability of the first and second round substrates with respect to the ultraviolet ray curing type resin, and capable of obtaining an optical recording disc with a good quality by providing an even film thickness of the cured ultraviolet ray curing type resin with the film thickness controlled to a predetermined value or less even in the case there are irregularity of the wettability of both round substrates with respect to the ultraviolet ray curing type resin, difficulty in controlling the centrifugal force applied on the uncured ultraviolet ray curing type resin, irregularity of the plate thickness of the first and second round substrates, or the like, can be obtained.

According to the fifth aspect of the present invention comprising the second aspect, since the pressure applied between the first and second round substrates is measured so that the pressuring operation between the first and second round substrates and the low speed rotation of the optical recording disc obtained by the uncured bonding are finished when the measured pressure becomes a predetermined value according to a predetermined thickness of the ultraviolet ray curing type resin layer, a production method of an optical recording disc, capable of achieving a beautiful outline shape of the inner peripheral part side rim part of the cured ultraviolet ray curing type resin substantially concentrically with the first and second round substrates by spreading the ultraviolet ray curing type resin to the inner peripheral side substantially concentrically with the first and second round substrates even in the case there is irregularity of the wettability of the first and second round substrates with respect to the ultraviolet ray curing type resin, and capable of obtaining an optical recording disc with a good quality by providing an even film thickness of the cured ultraviolet ray curing type resin with the film thickness controlled to a predetermined value or less even in the case there are irregularity of the wettability of both round substrates with respect to the ultraviolet ray curing type resin, difficulty in controlling the centrifugal force applied on the uncured ultraviolet ray curing type resin, irregularity of the plate thickness of the first and second round substrates, or the like, can be obtained.

According to the sixth aspect of the present invention comprising the second aspect, since the movement amount of the first or second round substrate from a reference position during the pressuring operation between the first and second round substrates is measured so that the pressuring operation between the first and second round substrates and the low speed rotation of the optical recording disc obtained by the uncured bonding are finished when the measured movement amount becomes a predetermined value according to a predetermined thickness of the ultraviolet ray curing type resin layer, a production method of an optical recording disc, capable of achieving a beautiful outline shape of the inner peripheral part side rim part of the cured ultraviolet ray curing type resin substantially concentrically with the first and second round substrates by spreading the ultraviolet ray curing type resin to the inner peripheral side substantially concentrically with the first and second round substrates even in the case there is irregularity of the wettability of the first and second round substrates with respect to the ultraviolet ray curing type resin, and capable of obtaining an optical recording disc with a good quality by providing an even film thickness of the cured ultraviolet ray curing type resin with the film thickness controlled to a predetermined value or less even in the case there are irregularity of the wettability of both round substrates with respect to the ultraviolet ray curing type resin, difficulty in controlling the centrifugal force applied on the uncured ultraviolet ray curing type resin, irregularity of the plate thickness of the first and second round substrates, or the like, can be obtained.

According to the seventh aspect of the present invention, since a disc holding means for holding the first round substrate of an optical recording disc obtained by uncured bonding of a ring-like ultraviolet ray curing type resin disposed between first and second round substrates substantially concentrically with the first and second round substrates, a disc low speed rotation driving means for holding the second round substrate of the optical recording disc obtained by the uncured bonding for low speed rotation drive, a disc pressing and driving means for pressing the disc low speed rotation driving means against the first round substrate held by the disc holding means, a high speed rotation driving means for high speed rotation drive of the optical recording disc obtained by the uncured bonding, and an ultraviolet ray irradiating means for irradiating an ultraviolet ray to the optical recording disc obtained by the uncured bonding are provided, a production apparatus for an optical recording disc, capable of achieving a beautiful outline shape of the inner peripheral part side rim part of the cured ultraviolet ray curing type resin substantially concentrically with the first and second round substrates by spreading the ultraviolet ray curing type resin to the inner peripheral side substantially concentrically with the first and second round substrates even in the case there is irregularity of the wettability of the first and second round substrates with respect to the ultraviolet ray curing type resin, and capable of obtaining an optical recording disc with a good quality by providing an even film thickness of the cured ultraviolet ray curing type resin with the film thickness controlled to a predetermined value or less even in the case there are irregularity of the wettability of both round substrates with respect to the ultraviolet ray curing type resin, difficulty in controlling the centrifugal force applied on the uncured ultraviolet ray curing type resin, irregularity of the plate thickness of the first and second round substrates, or the like, can be obtained.

According to the eighth aspect of the present invention comprising the seventh aspect, since a pressure measuring means for measuring the pressure applied on the first and second round substrates is provided in the disc holding means so that the operation of pressing the disc low speed rotation driving means against the first round substrate by the disc pressing and driving means and the low speed rotation of the second round substrate by the disc low speed rotation driving means are finished when the pressure measured by the pressure measuring means becomes a predetermined value according to a predetermined thickness of the ultraviolet ray curing type resin layer, a production apparatus for an optical recording disc, capable of achieving a beautiful outline shape of the inner peripheral part side rim part of the cured ultraviolet ray curing type resin substantially concentrically with the first and second round substrates by spreading the ultraviolet ray curing type resin to the inner peripheral side substantially concentrically with the first and second round substrates even in the case there is irregularity of the wettability of the first and second round substrates with respect to the ultraviolet ray curing type resin, and capable of obtaining an optical recording disc with a good quality by providing an even film thickness of the cured ultraviolet ray curing type resin with the film thickness controlled to a predetermined value or less even in the case there are irregularity of the wettability of both round substrates with respect to the ultraviolet ray curing type resin, difficulty in controlling the centrifugal force applied on the uncured ultraviolet ray curing type resin, irregularity of the plate thickness of the first and second round substrates, or the like, can be obtained.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A method for producing an optical recording disc comprising the steps of:
   providing a first substrate and a second substrate;
   applying a resin on the first substrate;
   placing the second substrate in contact with the resin on the first substrate;
   spreading the resin between the first and second substrates to a predetermined thickness by:
   holding one of the first and second substrates fixed;
   rotating the other of the first and second substrates; and
   applying pressure to the first and second substrates;
   measuring the pressure applied to the first and second substrates;
   when the pressure applied reaches a predetermined value for obtaining a selected resin thickness, ending the rotating step and ending the applying step; and
   irradiating the resin to obtain the optical recording disc comprising the first and second substrates.

2. The method of claim 1, further comprising forming a data recording trace on a bonding surface of the first and second substrates.

3. The method of claim 1, further comprising forming an optical recording layer on a bonding surface of the first and second substrates.

4. A method for producing an optical recording disc comprising the steps of:
   providing a first substrate and a second substrate;
   applying a resin on the first substrate;
   placing the second substrate in contact with the resin on the first substrate;
   spreading the resin between the first and second substrates to a predetermined thickness by:
   holding one of the first and second substrates fixed;
   rotating the other of the first and second substrates; and
   applying pressure to the first and second substrates;
   measuring a distance moved by the first and second substrates from a reference position;
   when the distance reaches a predetermined value for obtaining a selected resin thickness, ending the rotating step and ending the applying step; and
   irradiating the resin to obtain the optical recording disc comprising the first and second substrates.

5. The method of claim 3, further comprising forming a data recording trace on a bonding surface of the first and second substrates.

6. The method of claim 3, further comprising forming an optical recording layer on a bonding surface of the first and second substrates.

7. A method of producing an optical recording disc comprising the steps of:
   providing a first substrate and a second substrate;
   applying a resin on the first substrate;
   placing the second substrate in contact with the resin on the first substrate;
   spreading the resin between the first and second substrates to a predetermined thickness by:
   holding one of the first and second substrates fixed;
   rotating the other of the first and second substrates; and applying pressure to the first and second substrates; and when the resin reaches a selected resin thickness, irradiating the resin.

8. The method of claim 7, further comprising forming a data recording trace on a bonding surface of the first and second substrates.

9. The method of claim 7, further comprising forming an optical recording layer on a bonding surface of the first and second substrates.

10. A method for producing an optical recording disc comprising the steps of:

providing a first substrate and a second substrate;

applying a resin on the first substrate;

placing the second substrate in contact with the resin on the first substrate;

spreading the resin between the first and second substrates to a predetermined thickness by:

holding one of the first and second substrates fixed;

rotating the other of the first and second substrates; and applying pressure to the first and second substrates;

measuring a distance moved by at least one of the first and second substrates from a reference position;

when the distance reaches a predetermined value for obtaining a selected resin thickness, irradiating the resin.

11. The method of claim 10, further comprising forming a data recording trace on a bonding surface of the first and second substrates.

12. The method of claim 10, further comprising forming an optical recording layer on a bonding surface of the first and second substrates.

* * * * *